United States Patent Office 3,409,562
Patented Nov. 5, 1968

3,409,562
CATALYST MANUFACTURE
Alan G. Bridge, El Cerrito, Calif., assignor to Chevron Research Company, a corporation of Delaware
No Drawing. Filed May 4, 1964, Ser. No. 364,821
7 Claims. (Cl. 252—457)

ABSTRACT OF THE DISCLOSURE

In a process for manufacturing a hydrocarbon conversion catalyst comprising preparing a catalyst support comprising silica and magnesia, calcining said support, impregnating said calcined silica-magnesia support with at least one metal compound selected from the group consisting of a compound of nickel and a compound of tungsten, drying said impregnated support and calcining said impregnated and dried support after at least one impregnation step to produce said catalyst, the improvement which comprises accomplishing said calcining of said support prior to impregnation at 600° to 700° F. for a period of from 0.2 to 20 hours.

---

This invention relates to catalyst manufacture, more particularly to manufacture of a hydrocarbon conversion catalyst useful for converting petroleum distillates and residua into various valuable products, and still more particularly to a hydrocracking conversion catalyst useful for producing a high ratio of middle distillates to gasoline.

The catalyst manufactured by the process of the present invention is not as susceptible to nitrogen poisoning as are the more highly acidic catalysts conventionally used in hydrocracking service. The catalyst is especially useful in hyrodcracking service for reasons including its lower nitrogen sensitivity than that of prior art hydrocracking catalysts employing conventional silica-alumina catalyst supports. The catalyst, prepared by certain novel calcination procedures, has a higher cracking activity in hydrocracking service and a higher denitrification rate constant in denitrification service than catalysts containing the same components that are not prepared by said novel calcination procedures. Still further, the catalyst is regenerable.

In accordance with the present invention there is provided, in a process for manufacturing a hydrocarbon conversion catalyst comprising preparing a catalyst support comprising silica and magnesia, calcining said support, impregnating said calcined support with at least one metal compound selected from the group consisting of a compound of nickel and a compound of tungsten, drying said impregnated support and calcining said impregnated and dried support after at least one impregnation step to produce said catalyst, the improvement which comprises accomplishing said calcining of said support prior to impregnation at a temperature not exceeding 700° F. for a period of from 0.2 to 20 hours, preferably 0.5 to 8 hours.

Further in accordance with the present invention there is provided a process for preparing a catalyst comprising silica-magnesia impregnated with nickel and tungsten which comprises forming a silica-magnesia catalyst support, calcining said catalyst support prior to impregnation at a temperature of not more than 700° F. for a period of from 0.2 to 20 hours, impregnating said calcined support with nickel and tungsten in at least one impregnation step, drying said impregnated support after each impregnation step, and caclining the impregnated and dried support, after at least one sequence of impregnation and drying, at a temperature of from 600° to 750° F. for a period of from 0.2 to 20 hours.

Still further in accordance with the present invention there is provided a process for manufacturing a hydrocarbon conversion catalyst which comprises forming a support comprising silica-magnesia particles, calcining said support at a temperature not exceeding 700° F., impregnating said calcined support with a solution of a nickel salt, drying said impregnated support, calcining said impregnated and dried support to produce a silica-magnesia support containing nickel, impregnating said nickel-containing support at least once with a solution containing a compound of tungsten, drying said impregnated catalyst support after each impregnation with said solution containing a compound of tungsten, and calcining the impregnated catalyst support, after at least one sequence of impregnation and drying, at a temperature of from 600° to 750° F., preferably 625° to 725° F., for a period of from 2 to 20 hours, preferably 3 to 10 hours, whereby a final catalyst is produced comprising silica-magnesia impregnated with nickel and tungsten and having an improved cracking activity and improved denitrification activity.

The silica-magnesia support, whether in the form of powder, coarser particles or pellets, is calcined at a temperature not exceeding 700° F., preferably 600° to 700° F., for a period of from 0.2 to 20 hours before any impregnation with metals. Particularly where silica-magnesia particles or pellets have been prepared by compressing silica-magnesia powder together with a conventional glue-type bonding and lubricant material calcination of the resulting compressed product should be accomplished for a sufficient period of time to adequately burn out the glue-type bonding material to prepare the support for subsequent impregnation. The support may be a commercial support or one prepared by any conventional method.

Preferably the silica-magnesia support is calcined at a temperature not exceeding 700° F., impregnated with nickel, dried and calcined at 600° to 750° F. for 2 to 20 hours, thereafter impregnated with tungstic acid dissolved in a mixture of ammonia and water, and dried and calcined at 600° to 750° F. for 2 to 20 hours, with additional steps of tungsten impregnation, drying and calcining at 600° to 750° F. for 2 to 20 hours as necessary to produce a final catalyst composite with a sufficiently high tungsten content. It is within the scope of the present invention to use any number of steps of impregnation of nickel and tungsten, in any order.

Preferably, calcination is accomplished after each impregnation step. Those skilled in the art will recognize that unless nickel nitrate, for example, is converted to the oxide form by calcination prior to subsequent impregnation with a tungsten salt, unsatisfactory results may be obtained.

The catalyst prepared by the process of the present invention may contain tungsten or a compound thereof in an amount of from 1 to 40 weight percent, preferably from 2 to 25 weight percent, based on the total catalyst composite; the nickel metal or compound thereof may be present in an amount of from 1 to 40 weight percent, preferably from 2 to 25 weight percent, based on the total catalyst composite. The magnesia content of the silica-magnesia support may range from 5 to 75 weight percent, preferably from 15 to 50 weight percent, and still more preferably from 20 to 25 weight percent.

The final catalyst composite may be used in hydrocracking service under conventional hydrocracking conditions, for example a temperature of about from 500° to 950° F., preferably from 650° to 850° F., a hydrogen partial pressure of from 500 to 3500 p.s.i.g., preferably 100 to 2500 p.s.i.g., and a liquid hourly space velocity of from about 0.1 to 4.0, preferably from 0.4 to 2.0.

The following Examples 1 and 2 set forth the preferred method for manufacturing the catalyst of the present invention, and hydrocracking results obtainable with the catalyst so manufactured. Example 3 sets forth for comparative purposes a method for manufacturing a catalyst that differs from the method set forth in Example 2 in that a higher support calcining temperature is used than is required by the process of the present invention. Example 3 also sets forth hydrocracking results obtainable with the catalyst of Example 3.

Example 1

A powdery silica-magnesia material containing about 28% magnesia is compressed, together with about 5% by weight of a conventional glue-type bonding and lubricant material used in catalyst preparation into 3/16" x 3/16" pellets, and is calcined in air at 700° F. for four hours.

1000 cc. of the aforesaid calcined material are impregnated for four hours with 800 cc. of a solution of nickel nitrate containing 11.2% nickel, and the impregnated material is dried for 24 hours at 250° F. and then calcined for four hours at 700° F. The resulting product is a catalyst support containing about 9% nickel.

The aforesaid catalyst support is impregnated three times with separate 800 cc. portions of a solution consisting of 960 g. of tungstic acid ($H_2WO_4$) dissolved in a mixture of 1152 cc. of 30% ammonia ($NH_3$) and 3460 cc. of water. After each of the aforesaid impregnation treatments, the impregnated composite is dried at 250° F. for 20 hours, and calcined at 700° F. for four hours. The catalyst resulting from the foregoing operations contains 5.1 weight percent nickel and 16.1 weight percent tungsten, and has a nitrogen surface area of 331 m.$^2$/g. When used to hydrocrack an Arabian gas oil feed at approximately 2000 p.s.i.g. and 1.0 LHSV, the catalyst accomplishes a per-pass conversion of approximately 55% to products boiling below the initial boiling point of the feed at a substantially lower starting temperature than is necessary to obtain the same per-pass conversion of the same feed under the same conditions with a catalyst that is prepared in the identical manner except that prior to impregnation the support is calcined at 950° F. for six hours. When used to denitrify a 550° to 850° F. Midway gas oil containing 2450 p.p.m. total nitrogen, at 2000 p.s.i.g. and 0.77 LHSV, the catalyst accomplishes denitrification, to an extent that the total nitrogen in the denitrified product is 1 p.p.m., at a substantially lower average catalyst temperature than would have been the case if, prior to impregnation, the catalyst support had been calcined at 950° F. for 6 hours.

Example 2

A silica-magnesia catalyst support was prepared by conventional methods except for calcining temperatures. The support was in the form of 1/8" particles of silica-magnesia extrudate, containing 30 wt. percent magnesia. The support was calcined, before impregnation, at a temperature of 700° F. for four hours. It was then impregnated with nickel and tungsten, and the final catalyst composite was calcined, all in accordance with procedures hereinabove described. The final catalyst composite had a nickel content of 13.4 wt. percent and a tungsten content of 13.9 wt. percent. The surface area was 324 m.$^2$/g. The catalyst was sulfided.

The aforesaid catalyst was used in a run of 250 hours to hydrocrack an Arabian gas oil boiling from 650° to 970° F. at a constant per-pass conversion of 55 volume percent of the feed to products boiling below the initial boiling point of the feed. The fouling rate during this period was approximately 0.16° F. per hour. The starting temperature required to obtain said per-pass conversion was 742° F.

Example 3

A silica-magnesia support was prepared as in Example 2, except that, prior to impregnation, it was calcined at 950° F. for six hours. It was then impregnated with nickel and tungsten, and the final catalyst composite was calcined, all as in Example 2. The final catalyst composite had a nickel content of 15.6 wt. percent and a tungsten content of 12.2 wt. percent. The surface area was 323 m.$^2$/g. The catalyst was sulfided.

The aforesaid catalyst was used in a run of 250 hours to hydrocrack a feedstock identical with the one in Example 2, at the same per-pass conversion. The fouling rate during this period was the same as in Example 2, but the starting temperature required to obtain said per-pass conversion was 752° F. This higher starting temperature would have been unexpected had the catalysts in Examples 2 and 3 had the same nickel and tungsten contents. It is even more surprising that the Example 3 catalyst with the higher nickel content had the lower activity, because it would normally be expected that the catalyst with the higher nickel content would have the higher activity.

Although the catalyst of the present invention may be used in the unsulfided form, the sulfided form is preferable. With feeds containing any substantial amounts of sulfur compounds, the catalyst automatically will tend to become sulfided on the surface under the operating conditions of the process. It is somewhat more preferable to presulfide the catalyst, by any conventional method, before placing it on stream.

Although an explanation for the higher activity of the catalyst of the present invention, compared with similar catalysts having a support calcined at higher temperatures prior to impregnation, is not necessary, and not binding, it is believed that the following explanation is correct. When the silica-magnesia support is calcined at temperatures higher than required by the present invention the magnesia is activated and reacts readily with the impregnating metal salt, resulting in poor distribution of the metal through the support and poorer performance in hydrocracking and hydrofining service.

I claim:

1. In a process for manufacturing a hydrocarbon conversion catalyst comprising preparing a catalyst support comprising silica and magnesia, calcining said support, impregnating said calcined silica-magnesia support with at least one metal compound selected from the group consisting of a compound of nickel and a compound of tungsten, drying said impregnated support and calcining said impregnated and dried support after at least one impregnation step to produce said catalyst, the improvement which comprises accomplishing said calcining of said support prior to impregnation at 600° to 700° F. for a period of from 0.2 to 20 hours.

2. A process as in claim 1 wherein said calcining of said support prior to impregnation is accomplished at 600° to 700° F. for a period of from 0.5 to 8 hours.

3. A process for preparing a catalyst comprising silica-magnesia impregnated with nickel and tungsten which comprises forming a silica-magnesia catalyst support, calcining said catalyst support prior to impregnation at 600° to 700° F. for a period of from 0.2 to 20 hours, impregnating said calcined support with nickel and tungsten in at least one impregnation step, drying said impregnated support after each impregnation step, and calcining the impregnated and dried support, after at least one sequence of impregnation and drying, at a temperature of from 600° to 750° F. for a period of from 2 to 20 hours.

4. A process as in claim 3 wherein the impregnated and dried support is calcined after at least one sequence of impregnation and drying at a temperature of from 625° to 725° F. for a period of from 3 to 10 hours.

5. A process for manufacturing a hydrocarbon conversion catalyst which comprises forming a support comprising silica-magnesia particles, calicining said support at 600° to 700° F., impregnating said calcined support with a solution of a nickel salt, drying said impregnated support, calcining said impregnated and dried support to produce a silica-magnesia support containing nickel, impregnating said nickel-containing support at least once with a solution containing a compound of tungsten, drying said impregnated catalyst support after each impregnation with said solution containing a compound of tungsten, and calcining the impregnated catalyst support, after at least one sequence of impregnation and drying, at a temperature of from 600° to 750° F. for a period of from 2 to 20 hours, whereby a final catalyst is produced comprising silica-magnesia impregnated with nickel and tungsten and having an improved cracking activity and improved denitrification activity.

6. A process as in claim 5 wherein said impregnated and dried support is calcined, after at least one sequence of impregnation and drying, at a temperature of from 625° to 725° F. for a period of from 3 to 10 hours.

7. A process as in claim 5, wherein the final catalyst composite contains from 1 to 40 weight percent of tungsten, from 1 to 40 weight percent of nickel, and said silica-magnesia support contains from 5 to 75 weight percent of magnesia.

References Cited

UNITED STATES PATENTS

| | | | |
|---|---|---|---|
| 2,703,789 | 3/1955 | McKinley et al. | 252—458 X |
| 2,731,397 | 1/1956 | Erickson | 252—457 X |
| 2,773,843 | 12/1956 | Kimberlin et al. | 252—457 |
| 2,898,305 | 8/1959 | Teter et al. | 252—457 X |
| 2,918,510 | 12/1959 | Carr et al. | 252—458 X |

DANIEL E. WYMAN, *Primary Examiner.*

C. F. DEES, *Assistant Examiner.*